United States Patent [19]

Totten

[11] 4,181,764
[45] Jan. 1, 1980

[54] WEATHER RESISTANT STRUCTURE AND METHOD OF MAKING

[76] Inventor: Clyde D. Totten, 31557 1/2 Castaic Rd., Castaic, Calif. 91310

[21] Appl. No.: 829,287

[22] Filed: Aug. 31, 1977

[51] Int. Cl.² .................. B32B 21/04; D06N 7/04
[52] U.S. Cl. ......................... 428/155; 256/19; 256/59; 427/297; 427/277; 427/358; 427/398 R; 428/332; 428/537; 428/339; 428/514
[58] Field of Search .......... 427/289, 358, 393, 398 R, 427/440, 277, 278, 245, 297; 428/513, 512, 514, 537, 155, 304, 332, 334, 335; 256/19, 59, 66; 156/244.18, 244.19; 264/171, 154, 145, 279, 275

[56]  References Cited
U.S. PATENT DOCUMENTS

| 2,055,002 | 9/1936 | Chandler | 427/289 |
| 2,663,652 | 12/1953 | Railing | 427/393 |
| 2,926,729 | 3/1960 | Zanini | 160/236 |
| 3,189,514 | 6/1965 | Shriver et al. | 428/513 |
| 3,207,831 | 9/1965 | Geller | 264/171 |
| 3,279,889 | 10/1966 | Rychly | 23/252 A |
| 3,395,062 | 7/1968 | Peters | 156/244 |
| 3,402,086 | 9/1968 | Smith et al. | 156/244 |
| 3,808,030 | 4/1974 | Bell | 427/289 |
| 3,914,463 | 10/1975 | Mercurio | 427/393 |
| 3,967,024 | 6/1976 | Beath et al. | 427/278 |
| 4,004,774 | 1/1977 | Houston | 428/512 |

FOREIGN PATENT DOCUMENTS

| 992388 | 5/1965 | United Kingdom | 156/244 |
| 1000975 | 8/1965 | United Kingdom | 256/19 |

Primary Examiner—Michael F. Esposito
Assistant Examiner—Sadie L. Childs

[57] ABSTRACT

A rail comprising, an elongated wooden core, a weather and abrasion resistant protective coating surrounding the core in contact relation therewith, and a plurality of one-way valve like perforations in the coating for releasing vapor from the core through the coating and substantially preventing the passage of water through the coating toward the core, and the method of manufacture thereof.

8 Claims, 3 Drawing Figures

U.S. Patent
Jan. 1, 1980
4,181,764
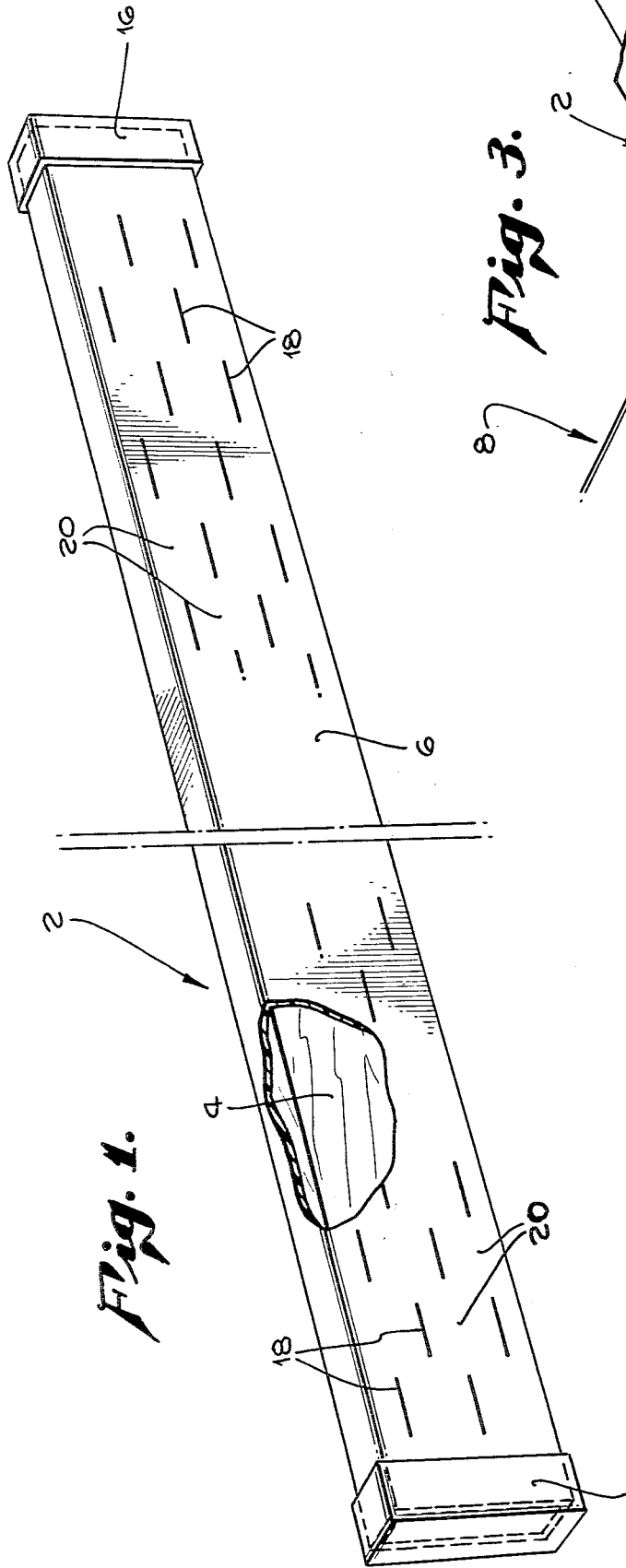
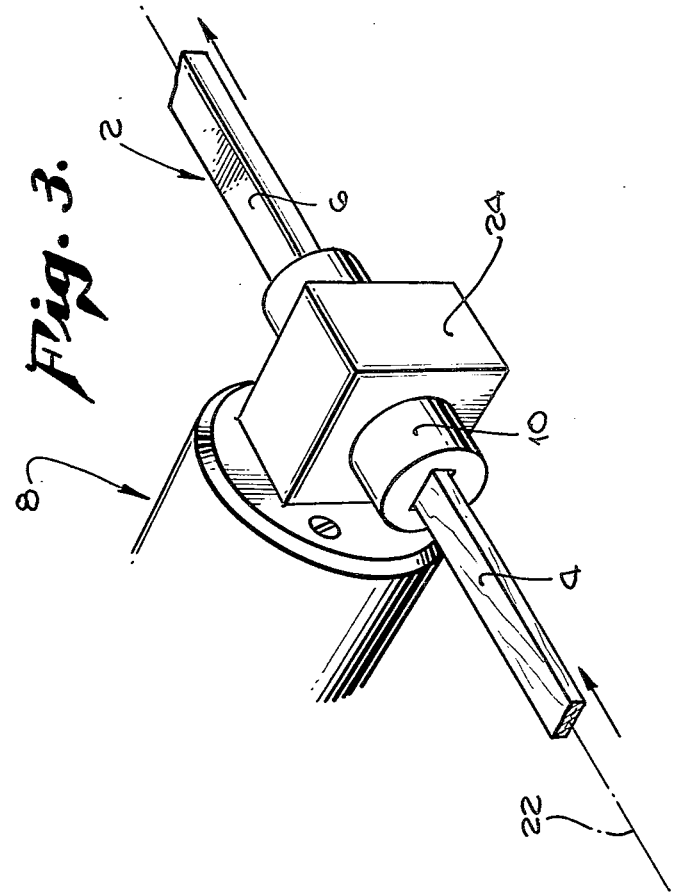
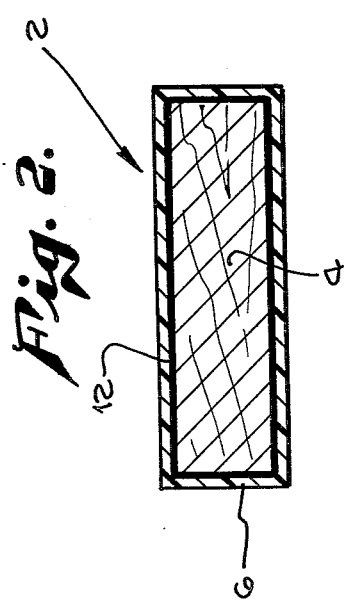

WEATHER RESISTANT STRUCTURE AND METHOD OF MAKING

BACKGROUND OF THE INVENTION

The invention relates to a rail comprising, an elongated wooden core, a weather and abrasion resistant protective coating surrounding the core in contact relation therewith, a plurality of valve means for releasing vapor from the core through the coating and substantially preventing the passage of water through the coating towards the core, and the method of manufacture thereof.

More particularly the present invention pertains to a wooden fence rail, which is used for the construction of animal corrals and pens, having a protective coating therearound for shielding the inner wooden core from animal chewing, weathering, wood rot, abrasion, splintering, and for aid in the prevention of breakage resulting from the powerful impact of an animal's kick. The coating also provides an attractive finish to the wooden core which is durable and long lasting.

Rails, posts, and the like have been known and used for many years as a means for "fencing in" private property, particularly property upon which ranch and farm animals such as horses, cows, and sheep are kept.

It has long been a major problem of many ranchers and farmers to construct and maintain sufficiently sturdy fences and corrals which remain effective and attractive over long periods of time. Specifically, problems arise as a result of long exposure to the weather, trapped moisture rotting the wood, animals chewing or "cribbing" the rail or post, animals kicking the rails or post, causing the same to break, and insects invading the wood resulting in the weakening and eventual destruction thereof. The term "rail" is intended to include all forms of wooden cored structures.

As a result of the foregoing problems, ranchers and farmers alike have been forced to repair, maintain, and replace the damaged rails all at considerable expense.

It is, therefore, a major object of the present invention to provide a coating which protects against abrasion, weathering, "cribbing," insect destruction, wood rot, and which aids in preventing breakage caused by the impact of an animal's kick.

It is a further object of the present invention to provide a rail comprising, an elongated wooden core, a weather and abrasion resistant protective coating surrounding the core in contact relation therewith, and a plurality of valve means for releasing vapor from the core through the coating and substantially preventing the passage of water through the coating toward the core.

It is still a further object of the present invention to provide a method of manufacture of a rail having a protective coating therearound comprising the steps of, selecting an elongated piece of wood, introducing the wood along its longitudinal axis into a crosshead die, the crosshead die being mounted on a plastic extrusion machine, extruding a thermoplastic resin on the wood forming a protective coating thereon, and allowing the coating to cool, the method including also the step of forming a plurality of one-way valve like perforations through the coating.

DESCRIPTION OF THE DRAWINGS

The invention will be further described as to an illustrative embodiment in conjunction with the attached drawings in which:

FIG. 1 is a perspective view of the invention;

FIG. 2 is a lateral cross-sectional view of the invention, and

FIG. 3 is a perspective view of the extrusion machine for coating the rail with a thermoplastic material.

DESCRIPTION OF THE PREFERRED EMBODIMENTS

As noted above, the invention provides for a rail comprised of an elongated wooden core and having an attractive weather and abrasion resistant coating in contact relation therearound for protecting the wooden core from animal "cribbing," wood rot, abrasions, insect destruction, weathering, and aiding in the prevention of breakage caused by the impact of an animal's kick. Formed within the coating is an additional feature, perforations, functioning as one-way valve means for releasing vapor from the core through the coating and substantially preventing the passage of water through the coating toward the core. As a result thereof, there is created a much reduced tendency for the wooden core to incur the problems resulting from wood rot. The invention further provides for a method of manufacture of a rail, as hereinbefore disclosed, comprising the steps of selecting an elongated piece of wood, introducing the wood along its longitudinal axis into a crosshead die, the crosshead die being mounted on a plastic extrusion machine, drawing a vacuum on the wood in the die, extruding a thermoplastic resin on the wood forming a protective coating thereon, withdrawing the coated product from the die at a rate sufficient to draw the coating into tight contact with the wooden core, and allowing the coating to cool, the method also including the step of forming a plurality of perforations through the coating.

With reference now to the drawings in detail, the rail 2 in one form is depicted in FIGS. 1 and 2. The elongated wooden core 4 of this invention may be selected from woods of various qualities, including, pine, fir, hemlock, oak, maple, birch, and others, and various sizes and shapes, including, round, square, and rectangular.

The coating 6 is typically formed from a thermoplastic material, such as polyvinyl chloride or polyethylene, and is extruded upon the elongated wooden core by means of an extrusion machine 8, depicted in FIG. 3, having a crosshead die 10 mounted thereon. Preferably the coating material can be pigmented with permanent colors and will be nonstaining. The coating 6 is formed tightly around the elongated wooden core 4 as a result of the extrusion process, although it may additionally be reinforced by means of an adhesive layer 12 interposed therebetween. Preferably, no adhesive is used and the coating need not be adhered to the core. The coating material may be solvent plasticized to aid in the extrusion process. Each end of the rail 2 is enclosed by caps 14, 16 to eliminate an exposed end once the rail 2 is installed. In general, the coating is at least 0.005 inches thick and is preferably at least 0.030 inches thick. Coatings ranging up to as much as 0.25 inches thick or even thicker may be used if desired, although coatings from 0.020 to 0.050 thick are generally satisfactory.

Formed within the protective coating 6 are a plurality of perforations or slits 18 normally located along the longitudinal axis of the rail 2. These slits 18 are preferably about one-quarter inch in length and are spaced by a distance 20, which is preferably approximately 2 to 3 inches along the longitudinal axis of rail 2. The slits are sized and spread so as to prevent the animal from grasping the small slits 18 with their teeth, enabling them to tear and rip the same. The slits may range in length from a pin hole to one-half inch, more or less, as desired and may be spaced as required to accomplish the desired result. Generally, pin hole perforations are spaced on approximately 1 to 2 inch centers for best results.

The rail 2 is manufactured by a method which includes introducing the wooden core 4 along its longitudinal axis 22 into a crosshead die 10 mounted on an extrusion head 24. A thermoplastic resin is extruded upon wooden core 4 as it passes through the crosshead die 10 and is allowed to cool once the extrusion process has been completed. Preferably the coating is chilled immediately by water. The plurality of one-way valve means or slits 18 can either be formed within the protective coating 6 concurrently with the extrusion process or thereafter, as desired. The perforations are formed by cutting entirely through the coating with a sharp blade or needle without removing any of the coating. In this way the perforations will open to relieve pressure from the inside so as to prevent blistering, but will close to substantially prevent at least liquid phase water from entering.

What has been described are preferred embodiments which modifications and changes may be made without parting from the spirit and scope of the accompanying claims.

What is claimed is:

1. A rail comprising:
   an elongated wooden core;
   a weather and abrasion resistant protective plastic coating having a thickness of at least about 0.020 inch; and
   a plurality of valve means for releasing vapor from said core through said coating and substantially preventing the passage of water through said coating toward said core, said valve means opening responsive to pressure from the core side of said coating.

2. The rail of claim 1 wherein said protective coating is comprised of polyvinyl chloride.

3. The rail of claim 1 wherein said protective coating is comprised of polyethylene.

4. The rail of claim 1 wherein said protective coating has a thickness of more than about 0.030 inch.

5. The rail of claim 1 wherein said valve means comprises slits in said coating having a length of approximately one-quarter inch.

6. The rail of claim 1 wherein said valve means comprises pin holes in said coating.

7. A rail comprising:
   an elongated wooden core;
   a weather and abrasion resistant protective plastic coating extruded upon and surrounding said core in contact relation therewith, said coating having a thickness of more than about 0.030 inch; and
   a plurality of valve means in said coating for opening responsive to pressure from the core side of said coating, permitting vapor to pass from said core through said coating and blocking the flow of water through said coating toward said core, said perforation means being formed in said coating without removing any said coating material, and including slits extending completely through said coating and spaced apart along the longitudinal axis of said rail.

8. The method of manufacture of a rail having a protective coating sheath therearound comprising the steps of:
   selecting an elongated piece of wood; and
   introducing said wood along its longitudinal axis into a crosshead die, said crosshead die being mounted on a plastic extrusion machine;
   subjecting said wood to a vacuum;
   extruding a thermoplastic resin on said wood while maintaining said vacuum and forming a protective coating enclosing said core, said coating having a thickness of at least about 0.020 inch thereon; and
   allowing said coating to cool, said method including the step of forming a plurality of spaced perforations through said coating without removing any of the coating material, said perforations defining valve means for releasing vapor from said wood through said coating and substantially preventing the passage of water through said coating toward said wood, said valve means being openable responsive to pressure from the core side of said coating.

* * * * *